US006383435B2

United States Patent
Savioli et al.

(10) Patent No.: US 6,383,435 B2
(45) Date of Patent: May 7, 2002

(54) METHOD AND APPARATUS FOR EXPANDING AND CONFERRING A CUP SHAPE TO THE TERMINAL JUNCTION SEGMENT OF BI-AXIALLY ORIENTED PIPES MADE OF THERMOPLASTIC MATERIAL

(75) Inventors: Leopoldo Savioli, Alfonsine Ravenna; Lauro Pezzi, Mezzano Ravenna; Giorgio Tabanelli, Cotignola Ravenna, all of (IT)

(73) Assignee: Sica S.p.A. (IT)

( * ) Notice: Subject to any disclaimer, the term of this patent is extended or adjusted under 35 U.S.C. 154(b) by 0 days.

(21) Appl. No.: 09/747,396

(22) Filed: Dec. 21, 2000

Related U.S. Application Data

(62) Division of application No. 09/259,470, filed on Feb. 26, 1999, now Pat. No. 6,220,846.

(30) Foreign Application Priority Data

Jan. 19, 1998 (IT) ......................................... RN98A0002
Feb. 26, 1998 (IT) ......................................... RN98A0006

(51) Int. Cl.[7] .......................... B29C 33/06; B29C 35/04; B29C 35/08; B29C 35/16; B29C 57/04
(52) U.S. Cl. ........................ 264/230; 264/486; 264/479; 264/519; 264/296; 264/322; 264/327; 264/404; 425/174.8 R
(58) Field of Search ................................. 264/479, 486, 264/519, 230, 296, 322, 327, 342 R, 500, 404; 425/174.8 R, 343, 384, 392, 393, 403

(56) References Cited

U.S. PATENT DOCUMENTS

| 3,496,610 | A | * | 2/1970 | Shelby et al. ................ 425/384 |
| 4,030,872 | A | * | 6/1977 | Parmann ...................... 425/393 |
| 4,113,813 | A | * | 9/1978 | Wilson ........................ 264/296 |
| 4,177,237 | A | * | 12/1979 | Ueno et al. .................. 264/296 |
| 4,218,208 | A | * | 8/1980 | Hayes et al. ................. 425/388 |
| 4,406,852 | A | * | 9/1983 | Riegel ......................... 264/296 |
| 4,457,886 | A | * | 7/1984 | Acda et al. .................. 264/249 |
| 4,526,732 | A | * | 7/1985 | Kakii et al. .................. 219/201 |
| 4,625,383 | A | * | 12/1986 | Vassallo et al. .............. 264/296 |
| 5,069,856 | A | * | 12/1991 | Holoubek et al. ........... 264/230 |
| 6,146,572 | A | * | 11/2000 | Visscher ...................... 264/230 |

FOREIGN PATENT DOCUMENTS

EP         98 83 07633        12/1998

* cited by examiner

Primary Examiner—Ian M. Silbaugh
Assistant Examiner—Michael I. Poe
(74) Attorney, Agent, or Firm—Orum & Roth

(57) ABSTRACT

A method and apparatus for conferring a cup shape to the terminal junction segment of pipes that are bi-axially oriented longitudinally and circumferentially and hence very sensitive to diameter and length reduction through heat. The apparatus includes a furnace which heats the segment to a differentiated temperature, increasing towards the end of the segment such that the inner diameter of the terminal segment progressively drops down to a controlled value as temperature increases (whilst length of the pipe is simultaneously reduced, with a corresponding increase in thickness of the wall of the terminal segment). Preferably then, in an appropriate station, an additional heating is executed to a plastic deformation temperature suited to obtain a correct preliminary dilation of the terminal segment, upon introducing a rigid element which acts as inner contrast, thereby inhibiting any retraction thereof. Thus, the segment undergoes a thickening of the dilated wall both during the introduction of the rigid element, and during its extraction therefrom. Such terminal segment, dilated and heated, is then easily and rapidly fitted onto a calibration expander, itself also heated to such a temperature as to limit heat absorption from the segment. Again the terminal segment thickens and takes its shape and, after the possible additional heating to force the terminal segment to adhere spontaneously and perfectly to the underlying expander. Finally, at least the outer surface of the terminal segment, thus shaped, is cooled.

15 Claims, 3 Drawing Sheets

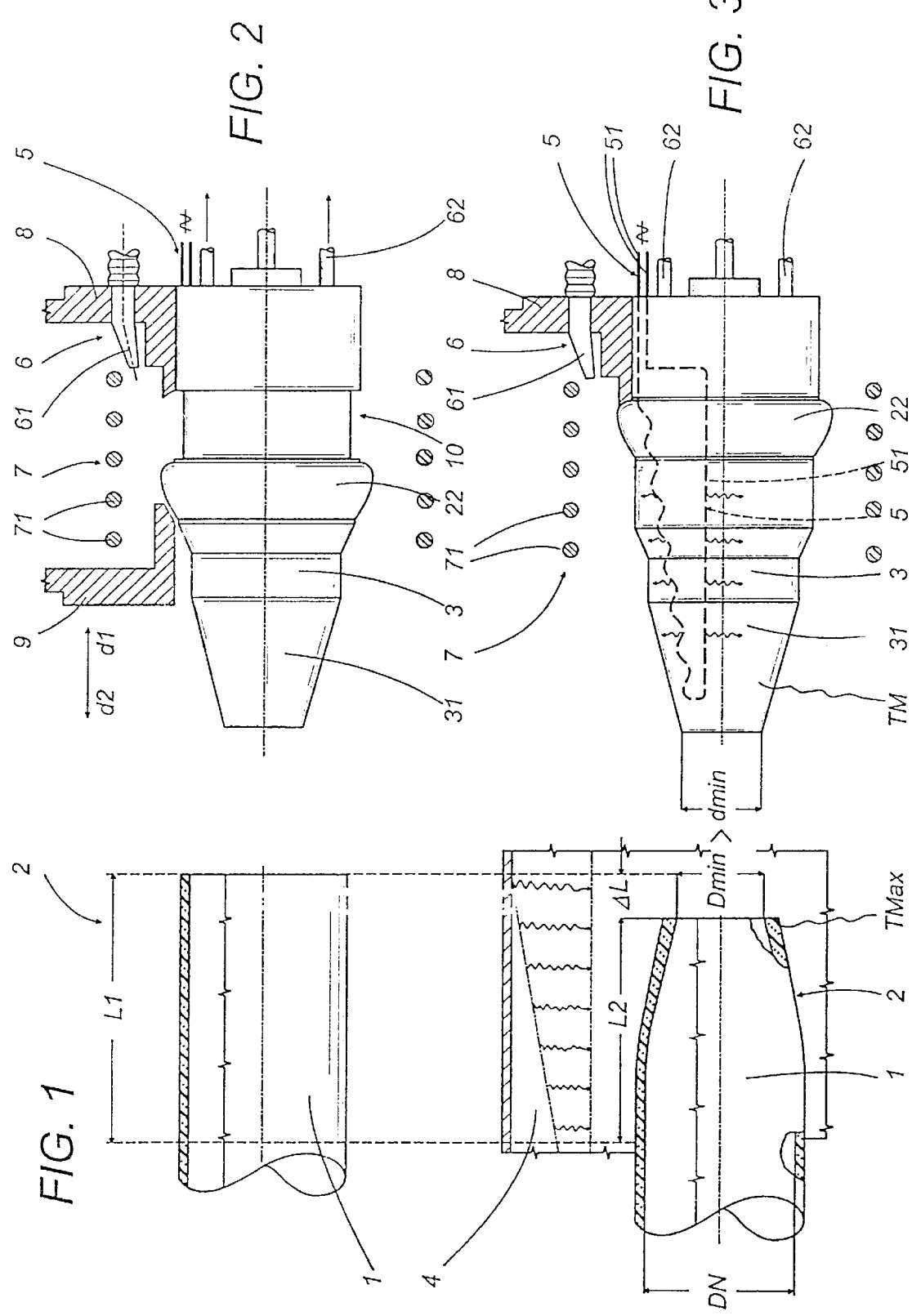

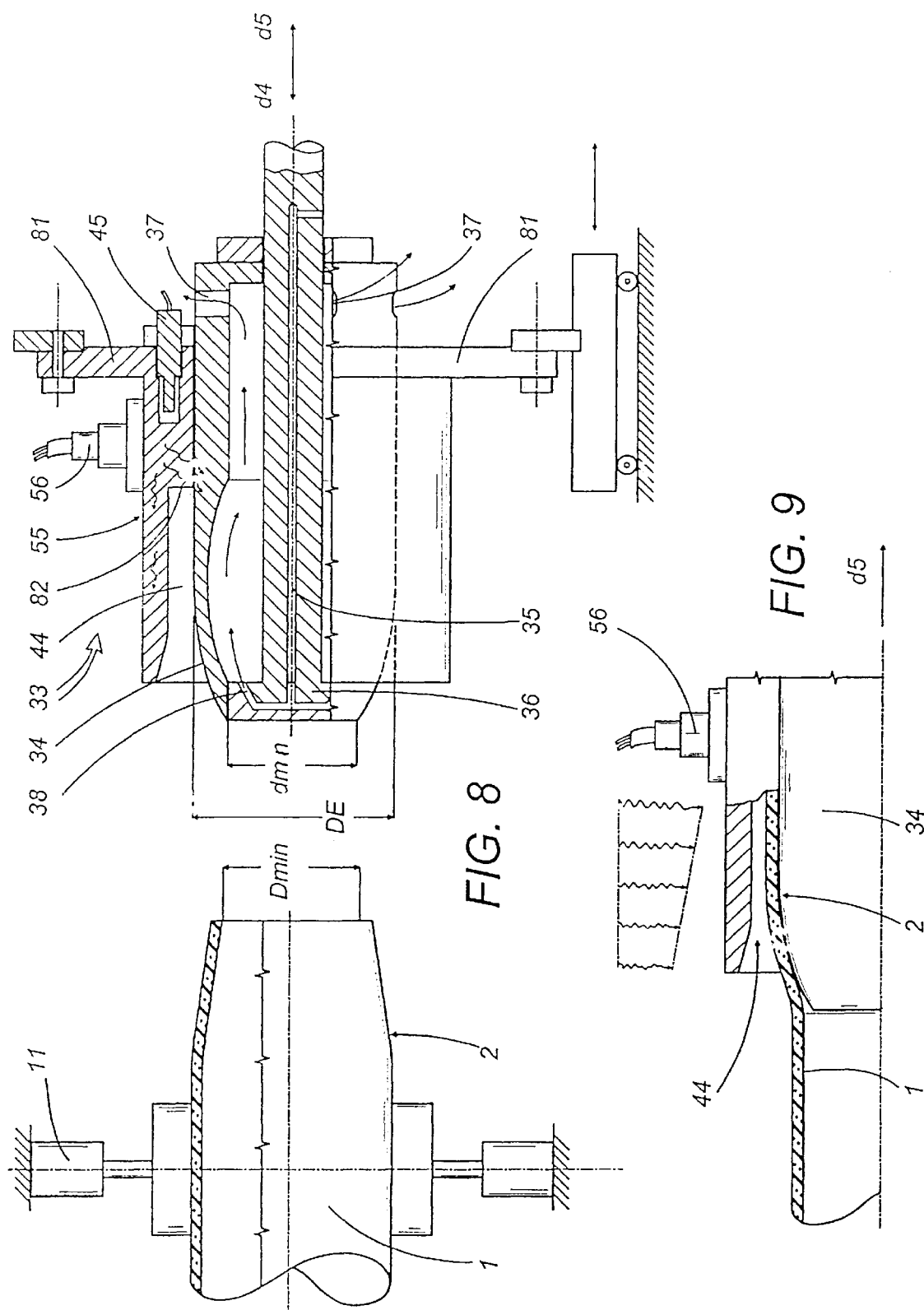

METHOD AND APPARATUS FOR EXPANDING AND CONFERRING A CUP SHAPE TO THE TERMINAL JUNCTION SEGMENT OF BI-AXIALLY ORIENTED PIPES MADE OF THERMOPLASTIC MATERIAL

This is a divisional of application(s) U.S. Ser. No.(s) 09/259,470 filed on Feb. 26, 1999, now U.S. Pat. No. 6,220,846.

BACKGROUND OF THE INVENTION

The present invention relates to an enhanced method for expanding and conferring a cup shape to the terminal junction segment of bi-axially oriented pipes made of thermoplastic material, by means of a calibration expander, able to expand the terminal segment, previously heated to the plastic state, shaping therein an annular circumferential seat for housing a corresponding sealing gasket for the junction.

As is well known, apparatuses that operate on thermoplastic materials such as PVC, polyethylene (PE) and/or polyolefins, which are not bi-axially oriented, comprise furnaces for the prior heating of the terminal segment. This pipe portion is brought to a temperature of about 120° C. or more, to obtain its adequate softening and enable then easily to fit it on the calibration expander, which dilates it and shapes it into the so-called "cup" conformation, to obtain an effective junction between the pipe thus treated and the end of another pipe, at the nominal diameter, once between the two ends is interposed the annular sealing gasket, stably positioned in the annular seat obtained in said terminal segment. Within the scope of this technology the calibration expander, in this case said to be the mechanical expansion type, may present a crown of radially expandable sections able to be retracted on command, with the purpose of shaping the annular seat of the terminal segment when there are expanded, and to let the expander easily exit the shaped terminal segment, then are retracted.

In this case it is evident that the annular gasket shall subsequently need to be inserted in the annular seat of the shaped and cooled terminal segment.

Alternatively to the above, the calibration expander may present an annular groove able simultaneously to retain the annular gasket introduced therein with a thrust flange which, once the gasket is inserted into the expander, causes it to be housed in the annular groove. Once this is accomplished, the phase of shaping the terminal segment starts, with the necessary aid of a flange for upsetting and holding the gasket, located downstream thereof. Subsequently, the expander is extracted, and in this case it can be defined as the free gasket type, after cooling the terminal segment, whilst the gasket remains trapped in the annular seat formed in the terminal segment.

The aforesaid technologies refer, as stated, to the treatment of pipes made of thermoplastic material not bi-axially oriented.

The latter technology entails a considerable reduction in the thickness of pipes made of thermoplastic material, for the same resistance to internal pressure, since it has been ascertained that, in these materials, if molecules constituting the material are stretched or elongated in a same direction or in mutually orthogonal directions, the thickness of the material decreases, but not its resistance to the internal pressure designed for the untreated pipe.

Thus technologies have been developed for the bi-axial orientation of the thermoplastic material, entailing a circumferential dilation of the pipe and its elongation or stretching in the axial direction. For example the international patent applications WO 95/25626, WO 95/25627, WO 95/25268, WO 95/30533 are mentioned. In this manner, for the same quantity or volume of material it is possible to produce a greater number of linear meters of pipe, which still meets the pressure resistance requirements originally prescribed.

However, such materials have an intrinsic characteristic which negatively reflects on the final product; if the extruded pipe initially has a certain diameter and, after the bi-axial orientation process, a clearly greater diameter which is the nominal one to be obtained, it tends drastically to reduce in diameter, if subjected to temperatures of a certain level, such as those able to soften the material for the processes whereby the terminal junction segment is formed according to the technologies illustrated above for pipes in non bi-axial thermoplastic material.

This is because the molecules of the thermoplastic materials that are subjected to diameter change "remember" the previous physical state and tend to return to the original state.

Hence, if a pipe is extruded to a certain diameter which is subsequently increased, in a bi-axial orientation treatment, if it were subjected to the temperatures (120° C. and higher) of the aforesaid furnaces its diameter would drastically decrease.

The aforesaid technologies, perfectly suited to shape the terminal segments of pipes made of thermoplastic material not subjected to bi-axial orientation processes or anyway particular subsequent diameter dilations, are therefore not at all applicable to pipes made of bi-axially oriented thermoplastic material.

The bi-axially oriented pipe would lose its thinness characteristics, tending to return to the original thickness, and therefore could not be fitted in the expander set for the useful nominal diameter, corresponding to the diameter of the bi-axially oriented pipe.

Moreover, even if it were possible to reduce the heating temperatures of the thermoplastic material to limit diameter reduction, the end segment thus obtained still would not be able to fit on the expander, because it would be too cold and thus would exert an excessively high progressive friction.

The applicant has also observed that, since there is a need for the temperature within the differentiated temperature furnace to be limited, in order to prevent the inlet to the terminal segment to be reduced excessively and to retain insofar as possible unaltered the bi-axial orientation characteristics, there could be a risk of damaging the terminal segment during a particularly stressful use of the treated pipe. Moreover, the shaping phase on the expander, though appropriately heated, may become excessively onerous, for pipes of considerable size and technical characteristics of resistance, both in terms of effort required, and of operating times, thus penalizing the hourly production of the pieces.

SUMMARY OF THE INVENTION

The aim of the present invention is to eliminate all the drawbacks mentioned abode, providing a method and an apparatus which, whilst using also previously known elements, solves the problems of effectively and simply shaping the terminal junction segment of pipes made of bi-axially oriented thermoplastic material, and also allows to increase hourly production of such treated pipes, reducing the duration of the longest working phase, which is the final shaping of the terminal segment on the calibration expander and guaranteeing the technical features of the product.

The invention, as it is characterized in the claims, with a particular and original heat treatment of the terminal segment of the bi-axially oriented pipe, allows it to receive a particular shape, tapered and converging at the tip. Moreover, the pipe, by reducing its length increases its thickness just where this is very useful, the terminal segment being subjected to higher radial stresses, due to its diameter, greater than the nominal diameter of the pipe.

Furthermore, heating to an appropriate temperature the expander as well, allows the terminal segment not to cede heat in any way to the expander itself.

Under such conditions, the tapered terminal segment can be fitted on the expander, with acceptable friction and anyway favored by the fact that the expander itself, when it penetrates in the terminal segment, finds increasing diameters.

In any case, during this phase, the terminal segment thickens further, allowing it to reach thicknesses that are able easily to withstand the nominal design pressures in such segments.

Furthermore, the invention, with a particular and original additional heat treatment of the terminal segment of the bi-axially oriented pipe, allows its easy and more rapid shaping, while also eliminating any risk of subsequent drawbacks in correspondence with the terminal segment and maintaining excellent characteristics of bi-orientability and perfect resistance to nominal design pressures.

Additionally, with the subject invention, it is also possible to modify and/or control the thickness of the terminal segment, allowing to reach even greater thicknesses, optimal easily to withstand the nominal design pressures in such segments, once again with no need, as was the case in prior art processes, preventively to thicken the terminal segments.

Moreover, to guarantee under any condition the perfect adherence of the terminal segment to the underlying expander, in order to obtain excellent precision and internal conformations of the shaped segment, use is also made of a heat flash obtained from an electrical coil positioned around the terminal segment, which forces the segment itself, until it is internally contrasted by the metallic expander, strongly to adhere thereto.

An appropriate cooling, which can also be superficial in this case, concludes the process.

Both the subject method and apparatus can use either a mechanical expansion expander, or free gasket expanders.

BRIEF DESCRIPTION OF THE DRAWINGS

Further features and advantages of the invention shall become more readily apparent in the detailed description that follows, illustrated purely by way of non-limiting example in the accompanying drawings, in which:

FIG. 1 shows at the top a terminal junction segment of bi-axially oriented pipe and, at the bottom, a progressive heating furnace with the consequent plastic deformation of the aforesaid terminal segment;

FIG. 2 shows the apparatus relating to a free gasket expander, with some details;

FIG. 3 shows the apparatus of FIG. 2 with the gasket inserted on the expander and with other details;

FIG. 8 shows the method and the apparatus according to a preferred embodiment of the invention, with a partially sectioned view and with some parts removed the better to highlight others;

FIG. 9 shows a part of the invention of FIG. 8, in one of its characteristic phases.

DESCRIPTION OF THE PREFERRED EMBODIMENTS

Figure 6:
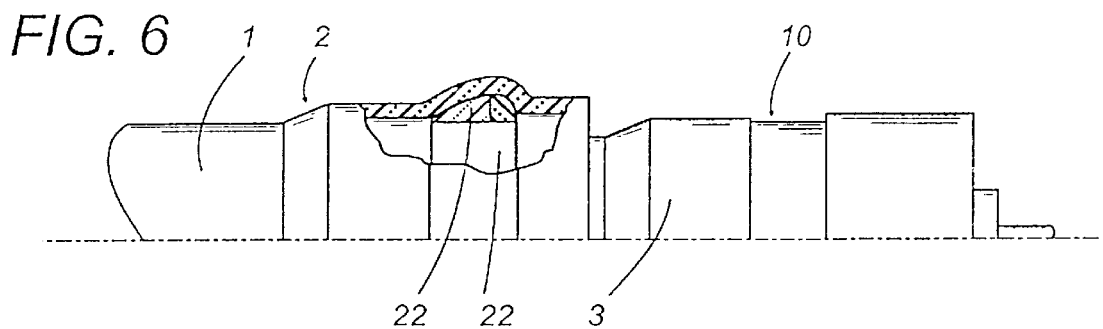
FIG. 6 shows the extraction of a free gasket expander from the terminal segment already treated according to the invention.
Figure 7:
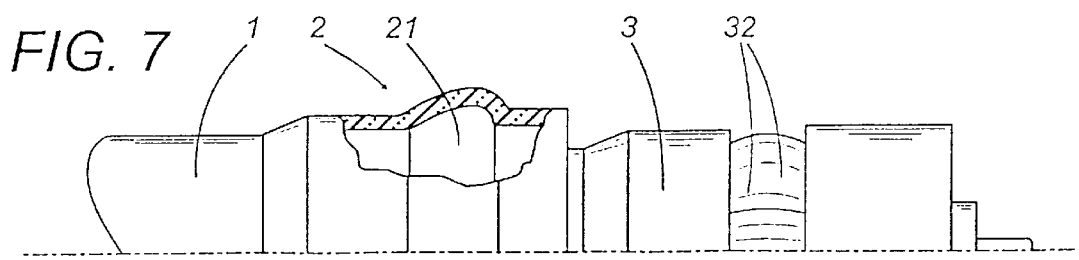
FIG. 7 shows the extraction of a mechanical expansion expander from the terminal segment already treated according to the invention.

The subject intention relates to a method for expanding and conferring a cup shape to the terminal junction segment of bi-axially oriented pipes made of thermoplastic materials. As previously stated, in known methods and apparatuses, in order to execute the aforesaid shaping in non bi-axially oriented thermoplastic pipes, the use is known of a calibration expander (3), able to expand the terminal segment (2), previously heated to the plastic state, shaping its circumferential annular seat (21) for housing a corresponding sealing gasket (22) for the junction. Such calibration expander can be of the mechanical expansion type or of the type defined above as with free gasket. In the case at hand, either one of such expanders can be used. In the first case (see FIG. 7, where an expander (3) with expandable sectors (32) in the retracted position is shown) it shall still be necessary to insert the gasket (22) inside the annular seat (21), after the end of operations and the exit of the expander from the terminal segment (2), whereas in the second case, as FIG. 6 clearly shows, this shall not be necessary, since the gasket (22) is already in its seat and therein it will remain, even after the expander is extracted (3). Conversely, in this latter case technical elements shall be necessary, which shall be illustrated further on and which are not necessary in the first case.

The example illustrated herein which follows shall refer to the use of an expander of the second type illustrated above.

Preventively (see FIG. 2), a thrust flange (9), movable in the two opposite directions (d1–d2), thrusts, in the direction (d2), the gasket (22) previously inserted on the expander (3), into the annular groove (10) of the expander (see FIG. 3).

The subject method or process comprises the phases listed below.

A first phase entails heating in a furnace (4) the terminal segment (2) of the bi-axially oriented pipe (1), to a differentiated temperature, increasing towards the end of the terminal segment (2). In the experiments conducted by the inventors, temperatures vary within a non-limiting range that is sharply lower than the (constant) ones located in the usual furnaces to soften the segments (2) made of the usual, non bi-axially oriented, thermoplastic material (120 decrees centigrade and more). Such temperatures must also be controlled so that the inner diameter (DN) of the terminal segment (2) progressively reduces with the increase of the temperature, which becomes the maximum temperature (Tmax), at the end of the terminal segment (2). The top limit of said maximum temperature is defined by the need for the minimum inner diameter (Dmin) of the terminal segment (2) to be greater than the minimum diameter (dmin) of the front end of the expander (3), so the expander (3) can be introduced in the terminal segment (2).

A second phase entails heating the calibration expander (3) to a temperature (TM) that exceeds or equals the maximum temperature (Tmax) located at the end of said terminal segment (2), to prevent the expander from removing heat from the terminal segment (2) during the subsequent phase of progressively and forcedly introducing the heated expander inside the terminal segment (2) of the pipe (1), phase which thus entails no heat transfer from the terminal segment (2) of the pipe to the expander. Such introduction is enabled and facilitated by the progressive diameter increase of the terminal segment (2) whilst the expander (3) progressively penetrates therein.

A subsequent phase entails cooling at least the outer surface of the shaped terminal segment (2), prior to extracting said expander (3). It has been noted that even a single outer surface cooling of the pipe would suffice to avoid subsequent spontaneous deformations after the expander (3) is extracted.

In the preferred embodiment of the invention, the upper limit of said maximum temperature is defined by the need for the minimum inner diameter (Dmin) of the terminal segment (2) to be greater than the minimum diameter (dmn) of the front end of a rigid element (34) whereon more shall be stated further on, instead of the expander (3). According to this embodiment, after this phase, a preliminary phase is provided whereby the terminal segment (2) is further heated to a plastic deformation temperature suited to obtain a correct circumferential dilation of the terminal segment (2), introducing a rigid element (34) also heated and acting as an inner contrast, thereby inhibiting, at least during such heating, any possibility of retraction by the terminal segment (2), contributing to its dimensional stabilization and thereby favoring its subsequent introduction on the calibration expander (3).

It is advantageous that the aforesaid preliminary dilation and heating phase occurs at a differentiated temperature, increasing as the end of the terminal segment (2) is approached and with an average value greater than that measurable in the furnace (4), in order to facilitate to the highest possible degree the subsequent introduction on the calibration expander (3), making the parts downstream of the end of the terminal segment (2) progressively more resistant In this case, the upper limit of the maximum temperature (Tmax), located at the end of the terminal section (2) inside the furnace (4) is such that the minimum inner diameter (Dmin) of the terminal section (2) must be greater than the minimum diameter (dmn) of the front end of the rigid element (34).

Simultaneously, the phase is provided of heating the calibration expander (3) to a temperature that minimizes heat subtraction from the terminal segment (2) during the progressive forced introduction of the heated expander (3) inside the terminal segment (2) of the pipe (1) preventively treated according to the invention.

Such introduction, thanks to the aforesaid preliminary phase, is quite facilitated and the expander (3) essentially has only the task of shaping the annular seat (21), with the material at the most suitable temperature.

A subsequent phase provides for cooling at least the outer surface of the shaped terminal segment (2), prior to extracting said calibration expander (3).

It is interesting to note that, during the first phase, a reduction in the length (L1) of the terminal segment (2) occurs spontaneously, for instance by a measure (ΔL), as shown in FIG. 1, which correspondingly causes an increase in the thickness of the thermoplastic material in said segment (2). Moreover, during the forced introduction of the expander (3) into the terminal segment (2) a phase whereby the wall of the terminal segment (2) thickens automatically sets in, which leads to a final thickness (s2) that is considerably greater than the initial thickness (S1) of the pipe, also with the decisive contribution of what occurs during said preliminary phase. In the preliminary phase constituting the subject of the invention, a considerable thickening of the wall of the terminal segment (2) automatically sets in because the rigid element (34), of greater diameter than the inner diameter (DN) of the terminal segment (2) is movable in the two directions (d4, d5), since it has first to be forcedly and progressively introduced, in the direction (d4) inside the terminal segment (2), held locked in place, and then retracted, in the opposite direction (d5), from the segment, prevented from lengthening, in the same direction, being blocked by a stop (82), fixed with respect to the rigid element (34). Hence both the introduction of the terminal segment (2), and the extraction of the rigid element (34) cause the material to thicken.

All this thus allows completely to eliminate operations for the preventive thickening of the terminal segment (2), since such thickening takes place spontaneously and sufficiently, thanks to the two aforesaid phases.

Figure 4:
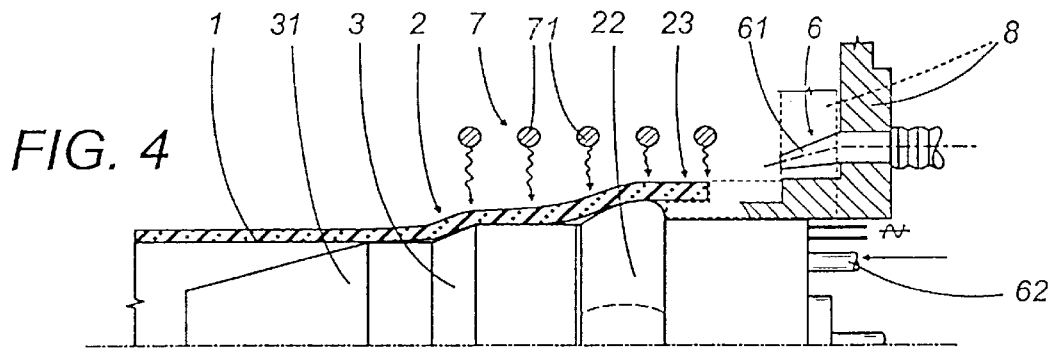
FIG. 4 shows the phase of progressively and forcedly introducing the expander inside the terminal segment of the pipe, with a further heating phase of the exterior of the terminal segment itself.

From the point of view of the method, it is preferable also to provide, after the phase whereby the expander (3) is forcedly introduced into the terminal segment (2) and prior to cooling, an intermediate phase able to develop an additional flash of direct heat on the terminal segment (2), as FIG. 4 clearly shows, thereby inducing such segment to contract spontaneously and to adhere closely on the underlying expander (3), to match its shape perfectly. In particular, prior to this phase, a flange (8) for upsetting and holding in place the gasket (22) is moved rear ward, as shown in FIG. 4, to allow also the retraction of the outer segment (23) which had previously climbed onto the foot of the upsetting flange (8), see dashed line in FIG. 4.

The apparatus of the invention comprises, in addition to said furnace (4), with the aforementioned characteristics, the calibration expander (3), which in particular comprises a long tapered segment (31) of the front part, able to facilitate the forced introduction of the expander (3) inside the terminal segment (2).

It also comprises:
  heating means (5), which are constituted by at least an electrical resistor (51) introduced inside the expander, as FIG. 3 clearly shows, able to heat the calibration expander (3) to a temperature useful to minimize heat subtraction;
  means (6) for cooling at least the outer surface of the shaped terminal segment (2), prior to the extraction of said expander (3).

Figure 5:
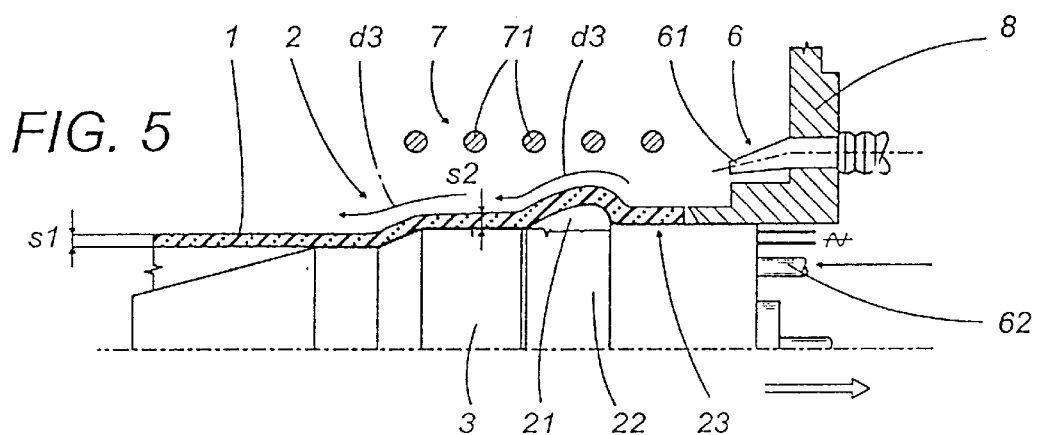
FIG. 5 shows a final cooling phase of the terminal segment.

The latter are in practice constituted at least by devices (61) for blowing cooling air. In particular, the blowing devices (61) are positioned around the expander (3) and supported by said upsetting flange (8), to distribute the cooling air as uniformly as possible along directions (d3) tangential to the outer surface of the shaped terminal segment (2), as shown in FIG. 5.

It is in any case possible to provide additional cooling means such as a loop with a cooling fluid (62), introduced inside the expander (3).

The subject invention aims, as stated in the description of the method, to improve the intrinsic characteristics of the terminal segment and to quicken its shaping into a cup. The apparatus comprises a station (33) for the further preliminary heating and circumferential dilation of the terminal segment (2), before it is fitted onto the expander (3). The station is provided with the rigid element (34) able to be forcedly and progressively introduced inside the terminal segment (2), locked by bilateral clamps (11), after the optimal heating of the rigid element (34) by its own heating means (55), until allowing a temperature of correct plastic deformation of the terminal segment (2). The rigid element (34) has a minimum front diameter (dmn) which progressively grows and then remains constant on a value (DE) corresponding to the definitive one of the shaped terminal segment (2). The station (33) advantageously comprises a second furnace (44) with differentiated temperature increasing towards the interior of the furnace itself and of an average value greater than that measurable inside the previous furnace (4). Movements are regulated by the fact that the station (33) is slidingly supported and the rigid element (34) is movable in the two directions (d4, d5) with respect to the station (33) itself. The thickening of the wall of the terminal section takes place, in this case, both due to friction during the introduction of the terminal segment (2) on the rigid element (34), and during the subsequent extraction of the rigid element itself. The station (33) comprises a flange (81), identifying inside the second furnace (44) a stop (82) of the forward edge of the terminal segment (2), where it exerts stress during the extraction, in the direction (d5) of the rigid element (34) of the terminal segment itself. This causes the further thickening of the material. It has been observed that through this additional thickening constant ratios are obtained between the diameter and the corresponding thicknesses of the pipe in the significant areas, i.e. along the pipe itself, in correspondence with the cylindrical part of the terminal segment and in correspondence with the annular seat for the gasket.

The differentiated temperature is obtained by means of a flow of cooled fluid which moves from the exterior to the interior of the furnace. In particular, the rigid element (34) comprises internal ducting (35), where the cooled fluid flows, ending in correspondence with a diffuser (36), located at the free front end of the rigid element (34), which routes the flow of cooled fluid towards the opposite end, until it discharges outwards, through holes (37) obtained along the rigid element (34) itself. The diffuser (36), advantageously, is provided with inclined holes (38), so as to route the flow of cooled fluid along the inner walls of the rigid element (34). To the same purpose also contributes the fact that the internal wall thickness of the rigid element (34) increases towards the interior of said second furnace (44).

The subject apparatus comprises a probe (45), able to regulate the heat produced by a band resistor (56), positioned circumferentially around said second furnace (66). It is also advantageous to provide additional heating means (7), able to develop a further flash of direct heat on the terminal segment (2), thereby inducing such segment to contract and closely adhere on the underlying expander (3), in order to match its shape perfectly, means comprising for instance an electrical coil (71) wound around the expander (3).

The invention can be subject to numerous modifications and variations, without thereby departing from the scope of the inventive concept and of the claims that follow.

What is claimed is:

1. Method for expanding and conferring a cup shape to a terminal junction segment of biaxially oriented pipes made of thermoplastic by means of a calibration expander able to expand the terminal junction segment, which is preventively heated to a plastic state, by shaping the terminal junction segment to include therein a circumferential annular seat for housing a corresponding sealing gasket within the terminal junction segment, comprising the following phases:

heating within a first furnace the terminal junction segment to a differentiated temperature which increases towards the end of the terminal junction segment and which is controlled so that the inner diameter (DN) of the terminal junction segment itself is progressively reduced as temperature increases, which temperature becomes a maximum temperature (Tmax) at the end of the terminal junction segment;

further preventively heating, circumferentially dilating and thickening by friction the terminal junction segment simultaneously in a second furnace, the terminal junction segment being heated to a plastic deformation temperature in the second furnace and being circumferentially dilated and thickened by friction by means of an inner rigid element located within the second furnace;

heating the calibration expander;

progressively and forcedly introducing the heated expander inside the preventively heated terminal junction segment to shape and expand the terminal junction segment; and cooling at least the outer surface of the terminal junction segment shaped by the heated expander prior to extraction of the expander.

2. Method according to claim 1, wherein the terminal junction segment of the pipe inside the first furnace, during its differentiated heating, undergoes a phase whereby its length is reduced by a measure, correspondingly increasing the thickness of thermoplastic material in the terminal junction segment.

3. Method according to claim 1 wherein, during the forced introduction of the expander in the terminal junction segment, a phase automatically sets in whereby there is a thickening of the terminal junction segment such that the terminal junction segment reaches a final thickness (S2) greater than an initial thickness (S1).

4. Method according to claim 1, wherein the maximum temperature (Tmax), located at the inner end of the terminal junction segment inside the first furnace, is such that a minimum inner diameter (Dmin) of the terminal junction segment is greater than a minimum diameter (dmn) of a front end of the expander.

5. Method according to claim 1, wherein the expander is heated to a temperature (TM) that is greater than or equal to the maximum temperature (Tmax) located at the end of the terminal junction segment.

6. Method according to claim 1, wherein, after the forced introduction of the expander in the terminal junction segment and prior to cooling, an intermediate phase is provided whereby additional direct heat is developed on the terminal junction segment, thereby inducing the terminal junction segment to contract and conform closely to the expander in order to match its shape perfectly.

7. Method according to claim 1, wherein the inner rigid element inhibits, at least during the further preventively heating, circumferentially dilating and thickening phase, any possibility of retraction by the terminal junction segment thereby contributing to dimensional stabilization of the terminal junction segment in such a manner as to favor its subsequent introduction on the calibration expander.

8. Method according to claim 7, wherein the thickness of the terminal junction segment of the pipe progressively increases during differentiated heating inside the first furnace, undergoing a phase whereby its length (L1) is reduced by a measure (ΔL), during the forced introduction of the expander in the terminal junction segment, and, lastly, during the further preventively heating, circumferentially dilating and thickening phase, wherein during the further preventively heating, circumferentially dilating and thickening phase, a considerable thickening of the terminal junction segment sets in, since the rigid element, with a greater diameter than the inner diameter (DN) of the end of the terminal junction segment, is forcedly and progressively introduced inside the terminal junction segment of the pipe, which is locked in place, in a first direction as the end of the terminal junction segment is blocked by a stop which is fixed with respect to the rigid element and then is retracted, in a second opposite direction while the terminal junction segment prevented from lengthening.

9. Method according to claim 7, wherein the maximum temperature (Tmax), located at the end of the terminal junction segment inside the first furnace, is such that a minimum inner diameter (Dmin) of the terminal junction segment is greater than a minimum diameter (dmn) of a front end of the rigid element.

10. Method according to claim 7 wherein the rigid element is heated.

11. Method according to claim 10 wherein the thickness of the terminal junction segment of the pipe progressively increases during differentiated heating inside the first furnace, undergoing a phase whereby its length (L1) is reduced by a measure (ΔL), during the forced introduction of the expander in the terminal junction segment, and, lastly, during the further preventively heating, circumferentially dilating and thickening phase, wherein during the further preventively heating, circumferentially dilating and thickening phase, a considerable thickening of the terminal junction segment sets in, since the rigid element, with a greater diameter than the inner diameter (DN) of the end of the terminal junction segment, is forcedly and progressively introduced inside the terminal junction segment of the pipe, which is locked in place, in a first direction as the end of the terminal junction segment is blocked by a stop which is fixed with respect to the rigid element and then is retracted, in a second opposite direction, therefrom while the terminal junction segment is prevented from lengthening.

12. Method according to claim 7, wherein the further preventively heating, circumferentially dilating and thickening phase occurs at a differentiated temperature, increasing toward the end of the terminal junction segment and with an average value greater than that measurable in the first furnace, in order to facilitate the subsequent introduction of the expander into the terminal junction segment by making progressively more rigid the pipe downstream of the end of the terminal junction segment.

13. Method according to claim 12 wherein the rigid element is heated.

14. Method according to claim 12, wherein the thickness of the terminal junction segment of the pipe progressively increases during differentiated heating inside the first furnace, undergoing a phase whereby its length (L1) is reduced by a measure (ΔL), during the forced introduction of the expander in the terminal junction segment, and, lastly, during the further preventively heating, circumferentially dilating and thickening phase, wherein during the further preventively heating, circumferentially dilating and thickening phase, a considerable thickening of the terminal junction segment sets in, since the rigid element, with a greater diameter than the inner diameter (DN) of the end of the terminal junction segment, is forcedly and progressively introduced inside the terminal junction segment of the pipe, which is locked in place, in a first direction as the end of the terminal junction segment is blocked by a stop which is fixed with respect to the rigid element and then is retracted, in a second opposite direction, therefrom while the terminal junction segment is prevented from lengthening.

15. Method for expanding and conferring a cup shape to the terminal junction segment of biaxially oriented pipes made of thermoplastic material by means of a calibration expander having a front end comprising a long tapered segment able to expand a terminal junction segment, preventively heated to a plastic state, by shaping the terminal junction segment with a circumferential annular seat for housing a corresponding sealing gasket within the terminal junction segment, comprising the steps of:

applying a temperature distribution inside a furnace that uniformly increases with the distance from an inlet to the furnace, inserting the terminal junction inside the furnace and heating the terminal junction segment inside the furnace to a corresponding differentiated temperature that increases approaching the end of the terminal junction segment, controlling the differentiated temperature so that the inner diameter (Dmin) of the terminal junction segment itself is progressively reduced as the temperature increases, which temperature becomes the maximum temperature (Tmax) at the end of the terminal junction segment, the maximum temperature (Tmax) being such that the resulting minimum inner diameter (Dmin) of the terminal junction segment must be greater than the minimum diameter (dmn) of the front end of the calibration expander, the terminal junction segment of the pipe spontaneously undergoing a reduction in its length (L1) by a measure (ΔL) with a corresponding increase in its thickness while being heated within the furnace such that the terminal junction segment is tapered and converges toward its end, applying heating means able to heat the calibration expander to a temperature (TM) that is greater than or equal to the maximum temperature (Tmax) located at the end of the terminal junction segment to prevent the expander from removing heat from the terminal junction segment during a subsequent phase of forcibly introducing the calibration expander;

forcibly introducing the front end of the calibration expander inside the terminal junction segment which is tapered and converges toward its end to shape and deform the terminal junction segment; and applying means for cooling at least the outer surface of the shaped terminal junction segment prior to the extraction of the calibration expander.

* * * * *